United States Patent
Hiji et al.

(10) Patent No.: US 8,488,074 B2
(45) Date of Patent: Jul. 16, 2013

(54) DISPLAY MEDIUM

(75) Inventors: Naoki Hiji, Minamiashigara (JP); Chikara Manabe, Ebina (JP); Takeo Kakinuma, Minato-ku (JP); Tadayoshi Ozaki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 569 days.

(21) Appl. No.: 12/728,902

(22) Filed: Mar. 22, 2010

(65) Prior Publication Data
US 2011/0043716 A1 Feb. 24, 2011

(30) Foreign Application Priority Data

Aug. 24, 2009 (JP) .................. 2009-193653

(51) Int. Cl.
*G02F 1/135* (2006.01)
*G02F 1/133* (2006.01)

(52) U.S. Cl.
USPC .............................. 349/25; 349/33

(58) Field of Classification Search
None
See application file for complete search history.

(56) References Cited

U.S. PATENT DOCUMENTS

| | | |
|---|---|---|
| 6,392,725 B1 | 5/2002 | Harada et al. |
| 2004/0105614 A1 * | 6/2004 | Kobayashi et al. ............. 385/16 |

FOREIGN PATENT DOCUMENTS

| | | |
|---|---|---|
| JP | 10-177191 A | 6/1998 |
| JP | 11-149088 A | 6/1999 |
| JP | 2000-098326 A | 4/2000 |

* cited by examiner

*Primary Examiner* — Sarah Hahm
(74) *Attorney, Agent, or Firm* — Sughrue Mion, PLLC

(57) ABSTRACT

A display medium comprises: a pair of electrodes to which a voltage is applied; and a liquid crystal layer stack provided between the pair of electrodes. The liquid crystal layer stack contains a first liquid crystal layer having a first liquid crystal that undergoes transition into a specific alignment state in response to the voltage applied to the electrodes becoming equal to or greater than a first voltage value, and a second liquid crystal layer having a second liquid crystal that undergoes transition into the specific alignment state in response to the voltage becoming equal to or greater than a second voltage value. The second voltage value is greater than the first voltage value, and the second liquid crystal has a higher isotropic phase transition temperature than the first liquid crystal.

8 Claims, 10 Drawing Sheets

P:PLANAR ALIGNMENT STATE  F:FOCAL-CONIC ALIGNMENT STATE
H:HOMEOTROPIC ALIGNMENT STATE s:ORIENTATIONAL ORDER PARAMETER
T:LIQUID CRYSTAL TEMPERATURE
Tci:ISOTROPIC PHASE TRANSITION TEMPERATURE

P:PLANAR ALIGNMENT STATE   F:FOCAL-CONIC ALIGNMENT STATE
H:HOMEOTROPIC ALIGNMENT STATE

FIG. 8
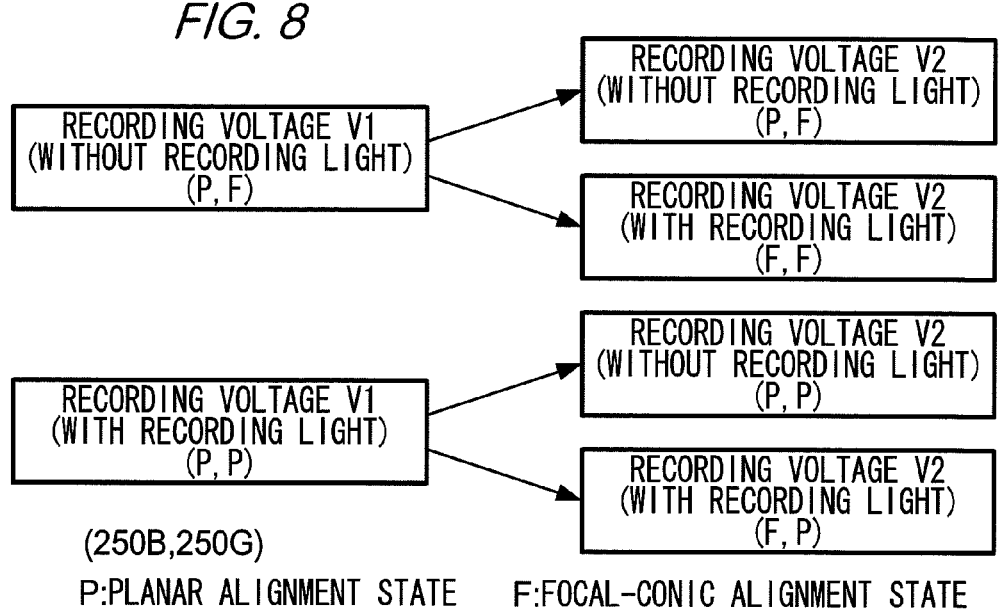
P:PLANAR ALIGNMENT STATE    F:FOCAL-CONIC ALIGNMENT STATE
FIG. 9
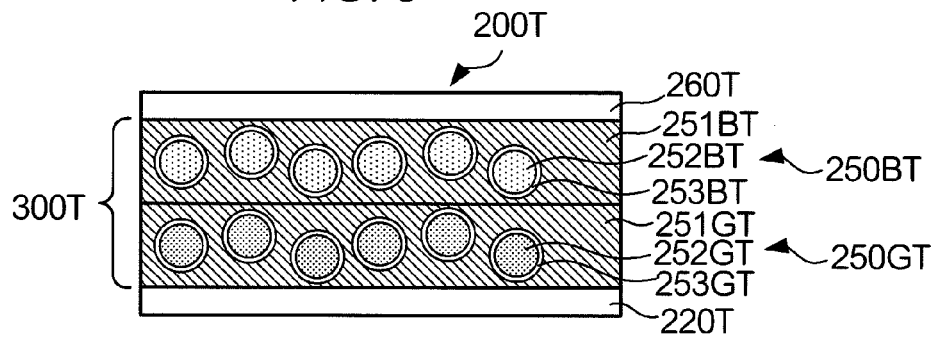
FIG. 10
| | SAMPLE NUMBER | MJO8423 (%) | MJO71934 (%) | 4-pentyl biphenyl (%) | ISOTROPIC PHASE TRANSITION TEMPERATURE TciG (°C) |
|---|---|---|---|---|---|
| COMPARISON EXAMPLE 1 | G-1 | 85.47 | 14.53 | 0 | 87.7 |
| EXAMPLE | G-2 | 85.47 | 11.11 | 3.42 | 79.5 |
| EXAMPLE | G-3 | 85.47 | 7.69 | 6.84 | 72.0 |
| EXAMPLE | G-4 | 85.47 | 4.27 | 10.26 | 63.6 |
| EXAMPLE | G-5 | 85.47 | 0 | 14.53 | 58.6 |

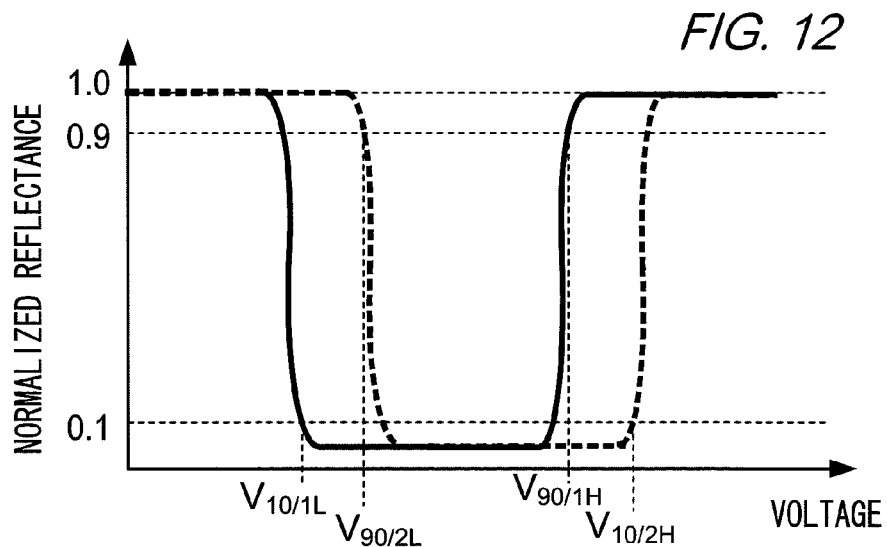
FIG. 12
FIG. 13A
| | SAMPLE NUMBER | DIFFERENCE IN ISOTROPIC PHASE TRANSITION TEMPERATURE TciG−TciB (°C) | LOWER VOLTAGE MARGIN (%) | UPPER VOLTAGE MARGIN (%) |
|---|---|---|---|---|
| COMPARISON EXAMPLE 1 | G-1 | 2.4 | 4.0 | 36.8 |
| EXAMPLE | G-2 | -5.8 | 24.9 | 38.9 |
| EXAMPLE | G-3 | -13.3 | 11.7 | 44.0 |
| EXAMPLE | G-4 | -21.7 | 24.4 | 49.8 |
| EXAMPLE | G-5 | -26.7 | 26.8 | 52.3 |
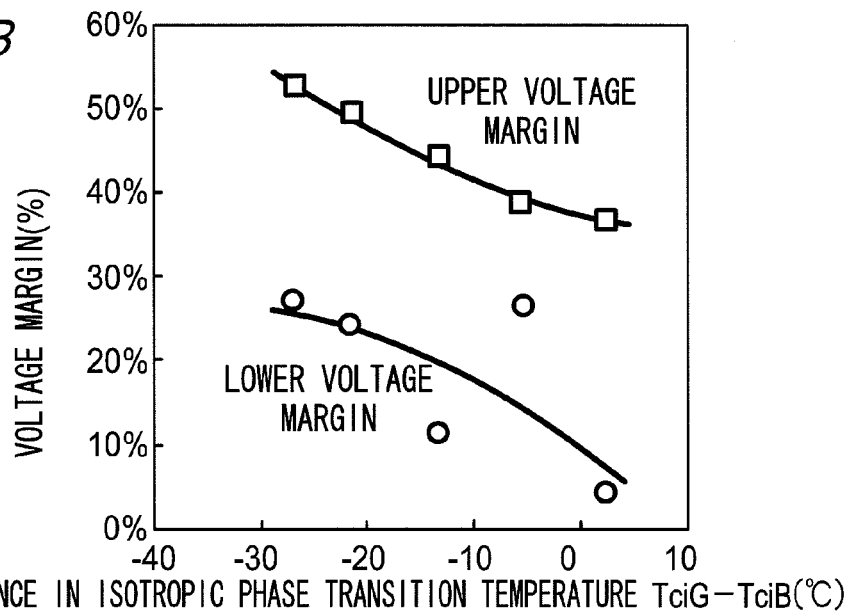
FIG. 13B

FIG. 14

| | SAMPLE NUMBER | MJO8423 (%) | R-1011 (%) | 4-pentyl biphenyl (%) | 4-n-pentyl-4"-cyano-p-terphenyl (%) | DIFFERENCE IN ISOTROPIC PHASE TRANSITION TEMPERATURE TciB−TciG (°C) | DIELECTRIC CONSTANT RATIO $\varepsilon b/\varepsilon g$ |
|---|---|---|---|---|---|---|---|
| EXAMPLE | B-1 | 84.03 | 1.68 | 14.29 | - | -39.5 | 0.43 |
| EXAMPLE | B-2 | 88.03 | 1.26 | 10.71 | - | -30.6 | 0.45 |
| EXAMPLE | B-3 | 92.02 | 0.84 | 7.14 | - | -21.9 | 0.50 |
| EXAMPLE | B-4 | 96.01 | 0.42 | 3.57 | - | -12.7 | 0.50 |
| EXAMPLE | B-5 | 100.00 | 0.00 | 0.00 | - | -3.5 | 0.50 |
| COMPARISON EXAMPLE 2 | B-6 | 99.29 | 0.08 | | 0.64 | 1.0 | 0.51 |

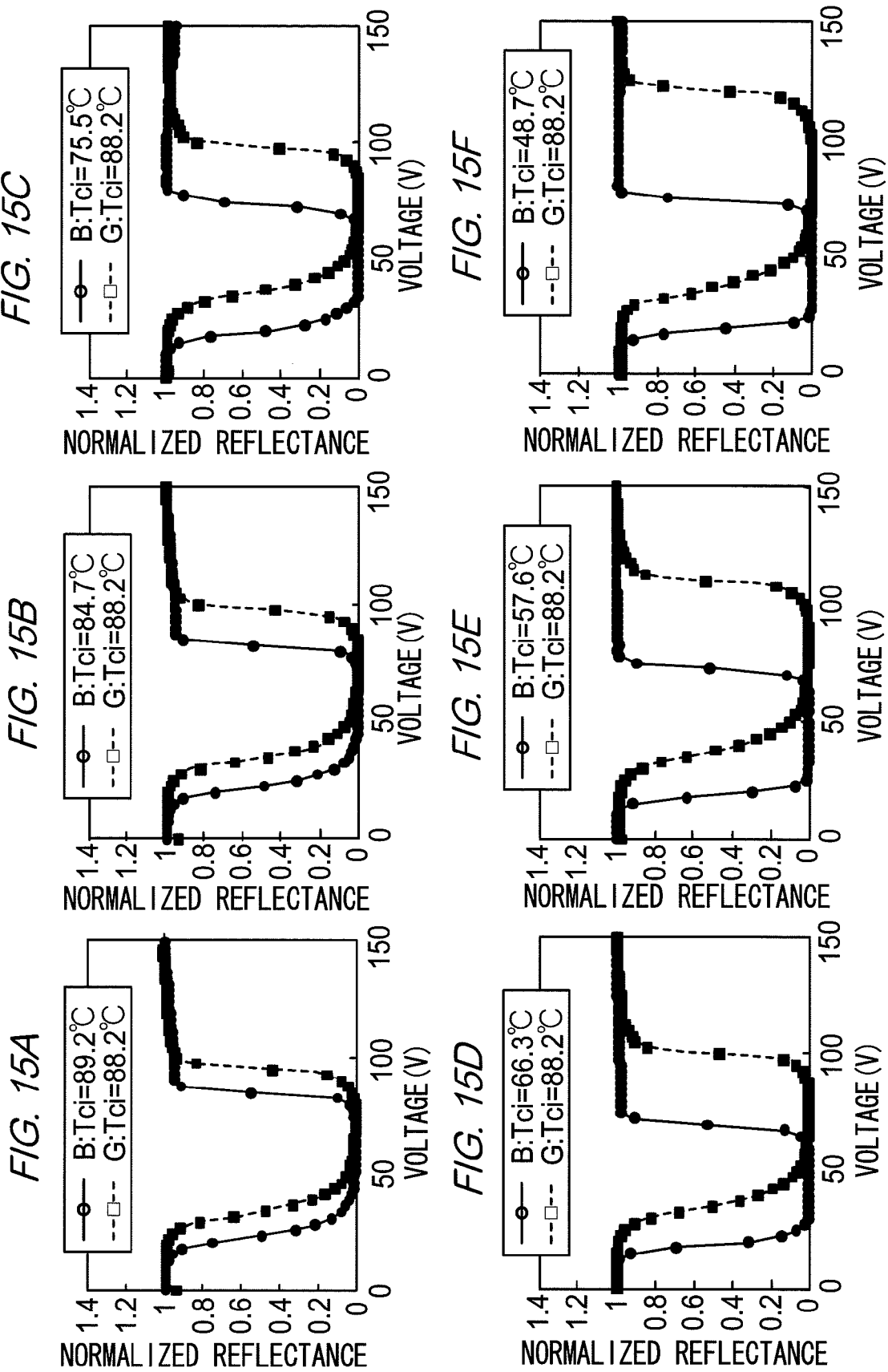

| | SAMPLE NUMBER | DIFFERENCE IN ISOTROPIC PHASE TRANSITION TEMPERATURE TciB−TciG (°C) | LOWER VOLTAGE MARGIN(%) | UPPER VOLTAGE MARGIN(%) |
|---|---|---|---|---|
| EXAMPLE | B-1 | -39.5 | 25.6 | 33.4 |
| EXAMPLE | B-2 | -30.6 | 21.8 | 28.7 |
| EXAMPLE | B-3 | -21.9 | 11.7 | 24.6 |
| EXAMPLE | B-4 | -12.7 | 3.8 | 17.7 |
| EXAMPLE | B-5 | -3.5 | -12.2 | 9.0 |
| COMPARISON EXAMPLE 2 | B-6 | 1.0 | -19.1 | 3.5 |

DISPLAY MEDIUM

CROSS-REFERENCE TO RELATED APPLICATIONS

This application is based on and claims priority under 35 U.S.C. 119 from Japanese Patent Application No. 2009-193653, which was filed on Aug. 24, 2009.

BACKGROUND

1. Technical Field

The present invention relates to a display medium.

2. Related Art

A technology has been disclosed for providing, in a liquid crystal display device having multiple cholesteric liquid crystal layers sandwiched between a pair of electrodes where individual cholesteric liquid crystal layers are driven independently upon application of a voltage to each electrode, cholesteric liquid crystal layers having different texture change threshold voltages.

SUMMARY

In an aspect of the present invention, there is provided a display medium comprising: a pair of electrodes to which a voltage is applied; and a liquid crystal layer stack provided between the pair of electrodes, the liquid crystal layer stack containing a first liquid crystal layer having a first liquid crystal that undergoes transition into a specific alignment state in response to the voltage applied to the electrodes becoming equal to or greater than a first voltage value and a second liquid crystal layer having a second liquid crystal that undergoes transition into the specific alignment state in response to the voltage becoming equal to or greater than a second voltage value, wherein: the second voltage value is greater than the first voltage value; and the second liquid crystal has a higher isotropic phase transition temperature than the first liquid crystal.

BRIEF DESCRIPTION OF THE DRAWINGS

Exemplary embodiments of the present invention will be described in detail based on the following figures, wherein:

FIG. 8 is a drawing that shows changes in an orientational state of liquid crystal layers 250B, 250G;

FIG. 9 shows a structure of stacked liquid crystal layers used in an experiment relating to an exemplary embodiment of the invention;

FIG. 10 is a table showing values of isotropic phase transition temperature TciG of liquid crystal 252GT in various samples;

FIG. 12 is a schematic diagram for explaining an upper voltage margin and a lower voltage margin;

FIGS. 13A and 13B are a table and a graph, respectively, showing a relationship between upper and lower voltage margins and a difference in isotropic phase transition temperature between liquid crystals 252BT and 252GT;

FIG. 14 is a table showing differences between isotropic transition temperature TciB of various samples of liquid crystal 252BT and isotropic transition temperature TciG of liquid crystal 252GT;

FIGS. 15A-15F are graphs showing normalized reflectances of liquid crystal layers 250GT, 250BT in relation to electric voltages applied to the stacked liquid crystal layers.

DETAILED DESCRIPTION

<Exemplary Embodiment>

Figure 1:
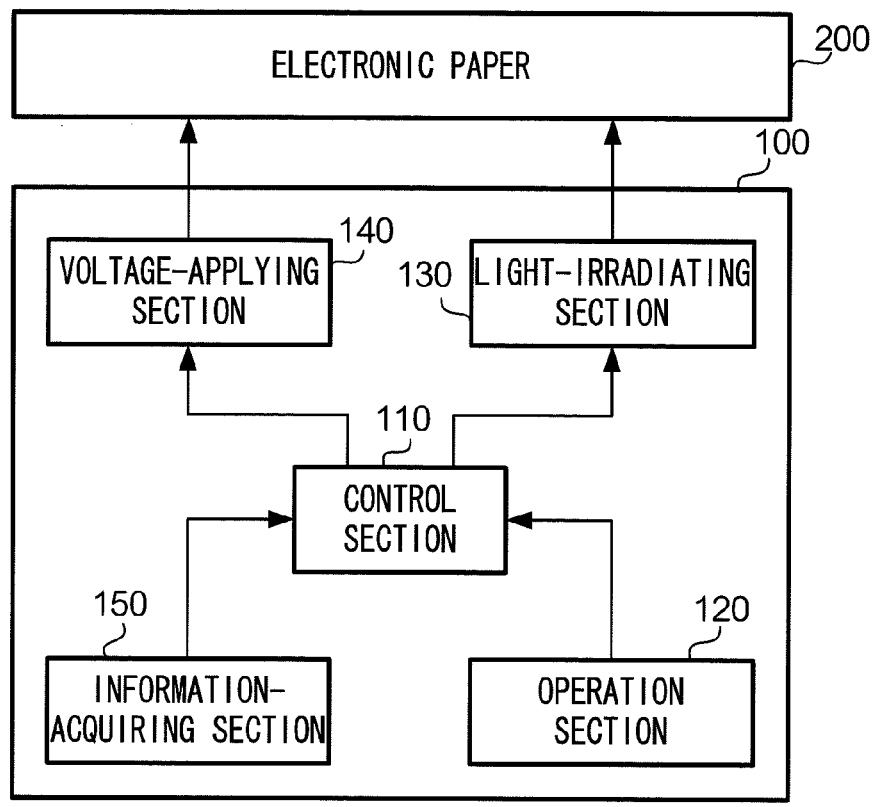
FIG. 1 is a block diagram showing a configuration of a recording apparatus relating to an exemplary embodiment of the present invention.

FIG. 1 is a block diagram showing a configuration of a recording apparatus 100 relating to an exemplary embodiment of the present invention. Recording apparatus 100 is an apparatus for recording images corresponding to image information on electronic paper 200 set on recording apparatus 100. Recording apparatus 100 has control section 110, operation section 120, light-irradiating section 130, voltage-applying section 140, and information-acquiring section 150.

Control section 110 includes a processing unit such as a CPU (Central Processing Unit) and a memory such as a RAM or hard disk, and controls operations of various sections of recording apparatus 100. Operation section 120 may include a touch panel, keyboard or the like via which a user can input instructions such as selection, confirmation, cancellation, etc., to recording apparatus 100. Thus, operation section 120 outputs information indicating contents of user operations to control section 110.

Light-irradiating section 130 includes a light source for irradiating light during recording of an image on electronic paper 200. The light source can be a planar light source utilizing a liquid crystal display or the like, and irradiates light toward electronic paper 200. By this light source, the light irradiated toward electronic paper 200 is emitted from regions of liquid crystal display, where each region consists of pixels of the liquid crystal display, and the regions that emit light are defined under the control of control section 110. As will be explained later, electronic paper 200 records an image in response to the light irradiation, and thus the size of a single pixel in electronic paper 200 corresponds to that of a single pixel in the liquid crystal display.

It should be noted that the light source may comprise a semiconductor laser device, light emitted from which is reflected on a reflecting member such as a rotating polygon mirror, so that the reflected light forms a spotlight-like light that impinges upon desired pixels of electronic paper 200, where the pixels serve as units in displaying an image. Also, the light source may be constituted by an LED array including a plurality of LEDs (Light Emitting Diodes) arranged in a linear pattern and lenses for focusing the light emitted from each LED to an area corresponding to a resolution desired for recording an image. In these cases, the irradiated light is controlled by control section 110 such that the irradiated light scans electronic paper 200.

Voltage-applying section 140 includes electrodes through which a recording voltage is applied to electronic paper 200 under the control of control section 110. When electronic paper 200 is set on recording apparatus 100, upon generation of recording voltage by voltage-applying section 140, the recording voltage is applied across transparent electrodes 220 and 260 or across transparent electrodes 222 and 262, each of which will be described later. Across which of the two pairs of electrodes the recording voltage is to be applied is determined by control section 110. It should be also noted that the applied voltage generated from voltage-applying section 140 is controlled by control section 110 such that its frequency and voltage amplitude change in a predetermined fashion, and this change is controlled so as to synchronize with the irradiation of recording light from light-irradiating section 130.

Information-acquiring section 150 acquires various items of information such as a control program, image information that indicates an image, etc. from an external device or memory (not shown in the drawings). In an example, information-acquiring section 150 utilizes a communication unit, which may be wireless or wired, to acquire information from the external device(s). The acquisition of information from the external device(s) is not necessarily limited to being performed using the communication unit but may also be achieved using a semiconductor memory device such as a USB (Universal Serial Bus) memory or any of various types of memory cards, or using an optical disk such as a recordable CD or DVD, and information-acquiring section 150 may include an interface for such storage media. The configuration of recording apparatus 100 has been explained above.

Figure 2:
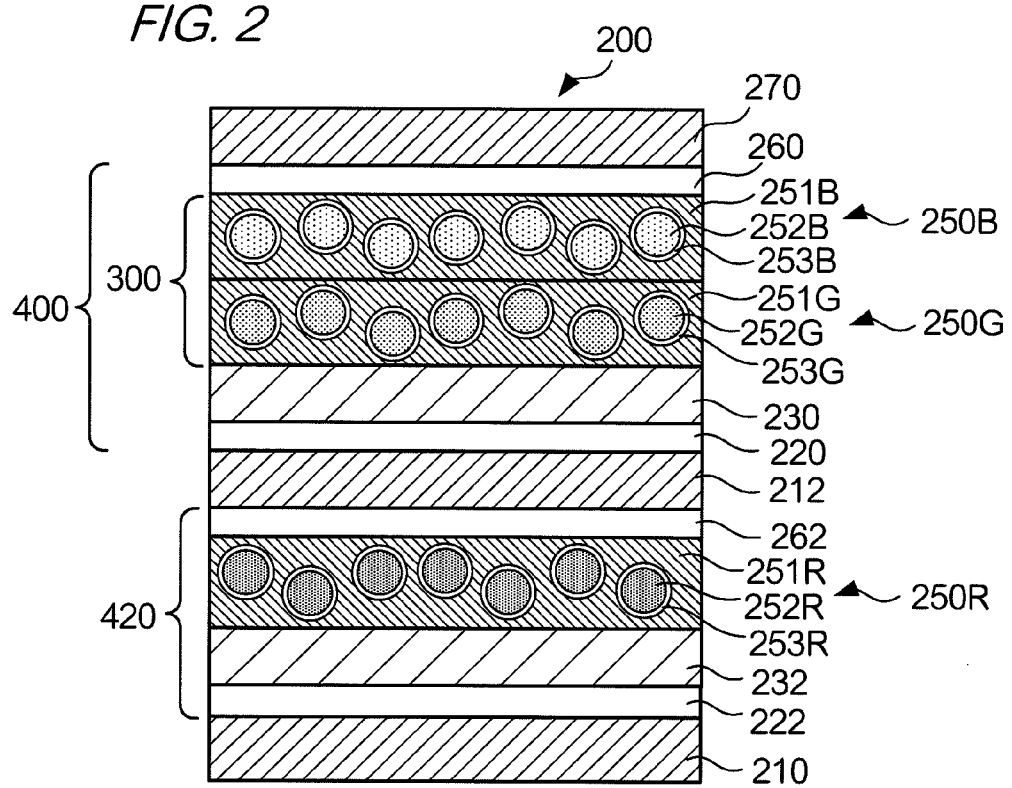
FIG. 2 shows a structure of an electronic paper relating to an exemplary embodiment of the present invention.

FIG. 2 shows a structure of electronic paper 200 that serves as a display medium of an optical recording type relating to an exemplary embodiment of the present invention. Electronic paper 200 is a display medium of an optical recording type that displays an image recorded in response to a recording light irradiated thereon while a predetermined recording voltage is applied, and includes first display layer 400 sandwiched between film substrates 270 and 212, and second display layer 420 sandwiched between film substrates 212 and 210. First display layer 400 has transparent electrodes 220, 260, photoconductive layer 230, and a stack of liquid crystal layers 300 (liquid crystal layers 250B, 250G). Second display layer 420 has transparent electrodes 222, 262, photoconductive layer 232, and liquid crystal layer 250R.

Film substrates 210, 212, 270 are provided for protecting a surface of electronic paper 200 and supporting a shape of the same. For example, they may be made of PET (Polyethylene Terephthalate). Film substrate 270 is disposed on a side of electronic paper 200 on which a recorded image is presented for observation by a user.

Transparent electrodes 220, 222, 260, 262 are layers having ITO (Indium Tin Oxide), for example. Each of transparent electrodes 220, 222, 260, 262 is connected to an electrode (not shown in the drawings). Each such electrode is connected to a corresponding electrode of voltage-applying section 140 when electronic paper 200 is set in recording apparatus 100. In this state, when a voltage is provided from voltage-applying section 140 via the electrodes, a voltage is applied between a pair of transparent electrodes 220, 260 or between a pair of transparent electrodes 222, 262, as described above.

Photoconductive layers 230, 232 are photosensitive layers having an electric conductivity that changes in response to generation of photoelectric charge caused by irradiation of recording light, and an organic photoconductive material may be used therefor, for example. In this example, photoconductive layer 230 is transparent to red light, and includes electric charge generating material responsive to blue and green light so as to absorb blue and green light. On the other hand, photoconductive layer 232 is transparent to blue and green light, and includes electric charge generating material responsive to red light so as to absorb red light.

In response to absorption of recording light, the resistance values of portions of photoconductive layers 230 and 232 that have absorbed the light decrease. When a voltage is applied between transparent electrodes 220 and 260 by voltage-applying section 140, the voltage is divided between photoconductive layer 230 and liquid crystal layer stack 300. Thus, the decrease in resistance value of photoconductive layer 230 causes an increase in the ratio of divisional voltage applied to liquid crystal layer stack 300 and a decrease in the ratio of divisional voltage applied to photoconductive layer 230. Also, when a voltage is applied between transparent electrodes 222 and 262 by voltage-applying section 140, the voltage is divided between photoconductive layer 232 and liquid crystal layer 250R, and the decrease in resistance value of photoconductive layer 232 causes an increase in the ratio of divisional voltage applied to liquid crystal layer 250R and a decrease in the ratio of divisional voltage applied to photoconductive layer 232.

Liquid crystal layers 250B, 250G, 250R include elements that can change orientation in response to an applied voltage to thereby change light-reflecting properties. For instance, such liquid crystal layers may include cholesteric liquid crystals (hereinafter referred to as liquid crystal 252B, 252G, 252R) encapsulated in micro capsules 253B, 253G, 253R dispersed in a binder resin (hereinafter referred to as binder 251B, 251G, 251R) such as water-soluble polymers that may include gelatin, PVA (polyvinyl alcohol), etc., or photo-curable or thermosetting polymers that may include acrylic resin, methacrylate resin, epoxy resin, etc. These liquid crystal layers may have other structures illustrated in FIGS. 3A-3C.

Figure 3A:
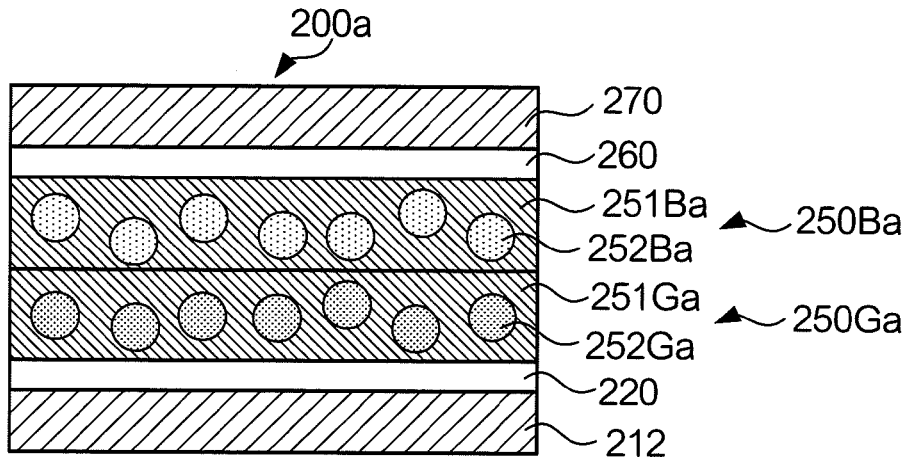
FIGS. 3A-3C show other structures of liquid crystal layers of an electronic paper.
Figure 3B:
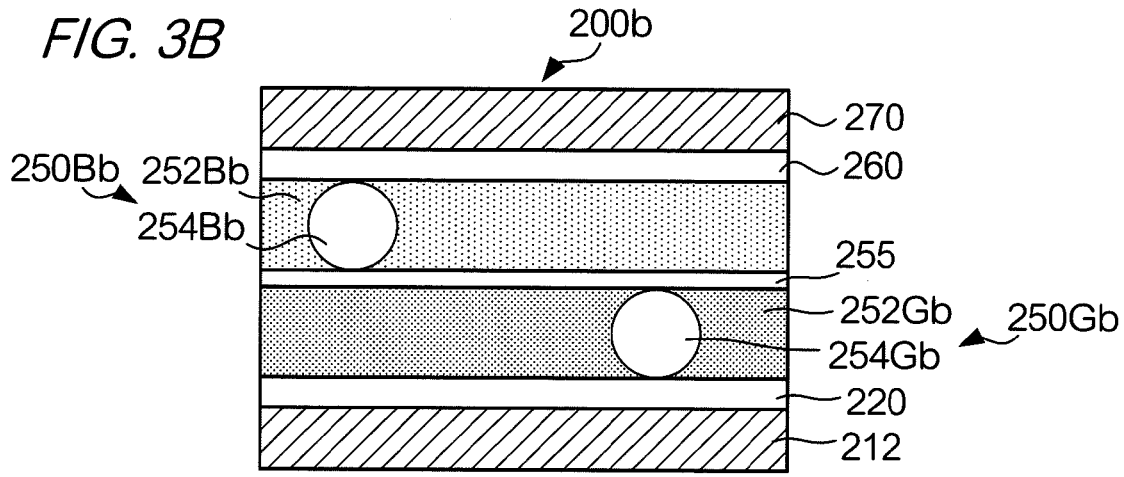
Figure 3C:
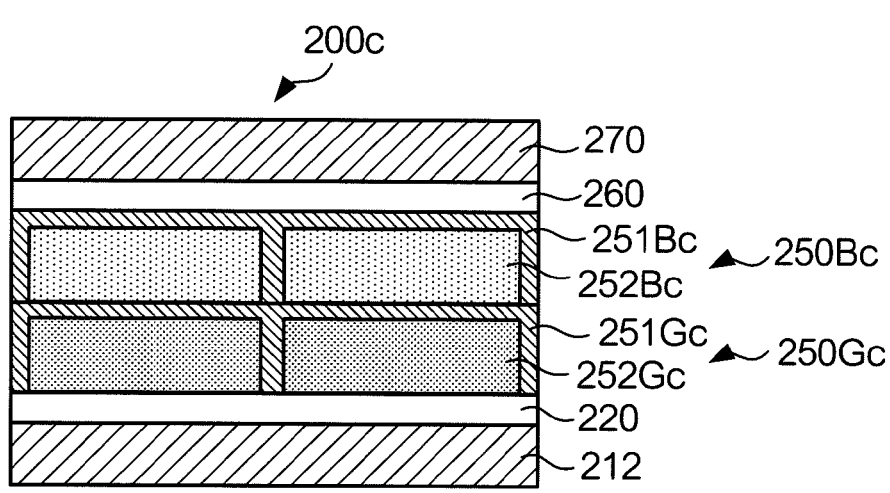

FIGS. 3A-3C show examples of other structures of liquid crystal layers. As can be seen in liquid crystal layers 250Ba, 250Ga of FIG. 3A, liquid crystals 252Ba, 252Ga may be dispersed directly in binders 251Ba, 251Ga, respectively. Also, as can be seen in liquid crystal layers 250Bb, 250Gb of FIG. 3B, liquid crystals 252Bb, 252Gb may be filled in spaces formed between a film 255 and film substrates 260, 220, where the spaces are retained by spacers 254Bb, 254Gb. Further, as can be seen in liquid crystal layers 250Bc, 250Gc of FIG. 3C, liquid crystals 252Bc, 252Gc may be filled in spaces defined and retained by partition walls 251Bc, 251Gc. It is to be noted that in FIGS. 3A-3C, photoconductive layers and liquid crystal layer 230R are not shown.

Cholesteric liquid crystal in which liquid crystal molecules have a helical structure divides the light incident along the helical axis into a right circularly polarized light wave and a left circularly polarized light wave, and exhibits selective reflection, in which the light wave component circularly polarized along the direction of twist of the helix undergoes Bragg reflection while the remaining light passes through the liquid crystal. The center wavelength $\lambda$ and reflection wavelength width $\Delta\lambda$ of the reflected light are expressed as $\lambda = n \cdot p$, $\Delta\lambda = \Delta n \cdot p$, respectively, where p is a helical pitch, n is an average refractive index in a plane substantially perpendicular to the helical axis, and $\Delta n$ is a birefringence, and thus, the color of light reflected by a cholesteric liquid crystal layer depends on the helical pitch.

It is desirable that the above characteristics are used to make liquid crystals 252B, 252G, 252R having helical pitches that match the desired wavelengths of light selectively reflected by liquid crystals 252B, 252G, 252R. For example, as for liquid crystal 252B, cholesteric liquid crystal MJ08424 (manufactured by Merck Ltd. Japan), which reflects green light, can be used as a host liquid crystal, and chiral dopant R-1011 (manufactured by Merck & Co., Inc.) is added to the host liquid crystal in a weight proportion of 2.25%. This results in a cholesteric liquid crystal that has a helical pitch of about 470 nm and thus selectively reflects blue light entering along the helical axis and having wavelengths distributed around 470 nm. As for liquid crystal 252G, cholesteric liquid crystal MJ08423 (manufactured by Merck Ltd. Japan), which reflects blue light, can be used as a host liquid crystal, and nematic liquid crystal MJ071934 (manufactured by Merck Ltd. Japan) and isotropic liquid (for example, 4-pentylbiphenyl (manufactured by Aldrich) are added to the host liquid crystal in respective weight proportions of 11.11% and 3.42%. This results in a cholesteric liquid crystal that has a helical pitch of about 540 nm and thus selectively reflects green light entering along the helical axis and having wavelengths distributed around 540 nm. In other words, liquid crystal 252G selectively reflects light having a wavelength distribution shifted to a longer wavelength side than the light reflected by liquid crystal 252B, and liquid crystal 252B selectively reflects light having a wavelength distribution shifted to a shorter wavelength side than the light reflected by liquid crystal 252G. It should be noted that though, in this example, liquid crystals 252B and 252G that selectively reflect blue light and green light, respectively, are used, two liquid crystals that selectively reflect light of other colors may be used so long as the wavelengths of the reflected light have the above relationship.

Liquid crystal 252G made as described above has a lower isotropic phase transition temperature Tci, at which a phase transition from an anisotropic phase (liquid crystal phase) to an isotropic phase (liquid phase) takes place, than liquid crystal 252B. It should be mentioned here that in nematic liquid crystals, rod-like molecules tend to be arranged in parallel to one another and a direction in which the rod-like molecules are aligned is referred to as a director. It is assumed that in such a state, the dielectric constant of liquid crystal 252G, specifically dielectric constant $\in P$ in a direction parallel to the director and dielectric constant $\in V$ in a direction vertical to the director, is lower than that of liquid crystal 252B. As a result, liquid crystal layer 250B has a higher dielectric constant than liquid crystal layer 250G in each of the directions, parallel and vertical, with respect to the director.

Liquid crystals 252B, 252G, 252R can be in a planar alignment state or focal-conic alignment state when no voltage is applied. In the planar alignment state, the helical axis of liquid crystals 252B, 252G, 252R becomes substantially vertical to the electrode surface, and the liquid crystals selectively reflect light corresponding to the adjusted helical pitches as described above. In the focal-conic alignment state, the helical axis of liquid crystals 252B, 252G, 252R becomes substantially parallel to the electrode surface, and light passes through the liquid crystals. By using these characteristics of cholesteric liquid crystal, it is possible to vary the color of each pixel of electronic paper 200 and display an image. Next, explanation will be made of the control of alignment state of liquid crystals 252B, 252G, 252R.

Figure 4:
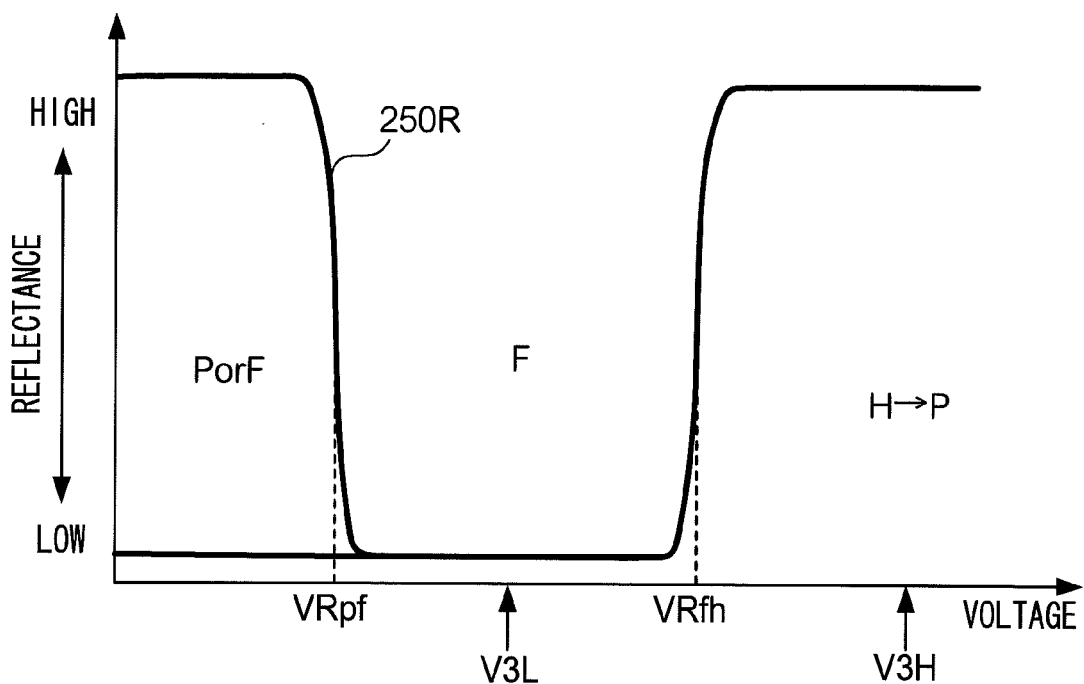
FIG. 4 shows an example of characteristics of a reflectance of liquid crystal layer 250R.

FIG. 4 shows exemplary characteristics of reflectance of liquid crystal layer 250R, for example. As shown in this drawing, when a voltage applied to liquid crystal layer 250R increases to exceed a threshold value VRpf (corresponding to a first threshold value), liquid crystal layer 250R undergoes transition into the focal-conic alignment state. When the voltage further increases to exceed a threshold value VRfh (corresponding to a second threshold value), liquid crystal layer 250R undergoes transition into a homeotropic alignment state. Then, when the application of electric voltage is stopped in the homeotropic alignment state, the alignment state changes to the planar alignment state and is stably maintained in that state.

The threshold values VRpf, VRfh of liquid crystal layer 250R are correlated with twist elastic constant $K_{22}$, bend elastic constant $K_{33}$, helical pitch p, thickness d of liquid crystal layer, vacuum dielectric constant $\in_0$, and dielectric-constant anisotropy $\Delta\in$, as follows:

$$VRpf = d\sqrt{\frac{2\pi\sqrt{2K_{22}K_{33}}}{pd\varepsilon_0\Delta\varepsilon}} \quad (1)$$

$$VRpf = \frac{\pi^2 d}{p}\sqrt{\frac{K_{22}}{\varepsilon_0\Delta\varepsilon}} \quad (2)$$

It should be noted here that dielectric-constant anisotropy $\Delta\in$, twist elastic constant $K_{22}$, and bend elastic constant $K_{33}$ have relationships shown below with orientational order parameter s, which is a value representing a degree of alignment of directions of liquid crystal molecules. Typically, orientational order parameter s can have a value from zero (0) to one (1), where one indicates that the directions of molecules are aligned completely, while zero indicates that the directions of molecules are random.

$$\Delta\in \propto s \quad (3)$$

$$K_{22} \propto s^2 \quad (4)$$

$$K_{33} \propto s^2 \quad (5)$$

From the above relationships, it can be deduced that threshold values VRpf, VRfh have the following correlation with orientational order parameter s:

$$VRpf \propto \sqrt{s} \quad (6)$$

$$VRfh \propto \sqrt{s} \quad (7)$$

Further, it is known that orientational order parameter s has a correlation with isotropic phase transition temperature Tci, which is a temperature at which the phase transition from a cholesteric liquid crystal phase to an isotropic phase occurs.

Figure 5:
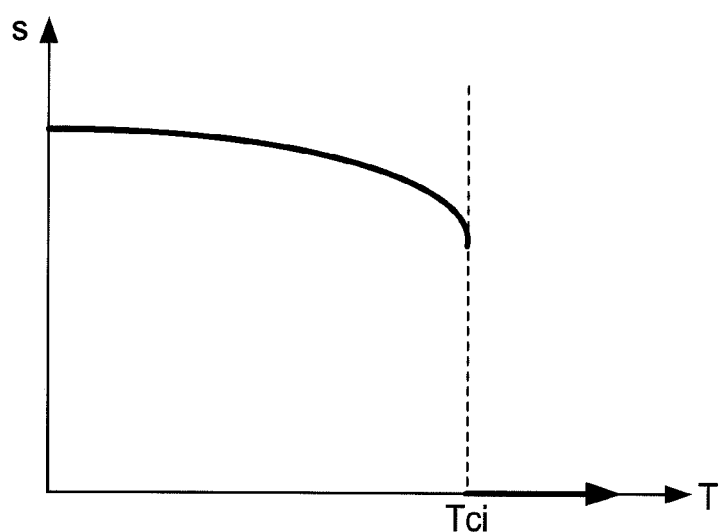
FIG. 5 is a graph showing a correlation between orientational order parameter s and isotropic transition temperature Tci.

FIG. 5 is a graph showing the correlation between orientational order parameter s and isotropic phase transition temperature Tci. The vertical axis indicates orientational order parameter s while the horizontal axis indicates temperature T of liquid crystal. While the liquid crystal temperature T is below isotropic phase transition temperature Tci, i.e., while the liquid crystal is in a liquid crystal phase, the value of orientational order parameter s decreases as the liquid crystal temperature T increases. Then, when the liquid crystal temperature T reaches isotropic phase transition temperature Tci, the liquid crystal undergoes a phase transition to a liquid phase, and orientational order parameter s becomes zero.

Here, the values of orientational order parameter s of two liquid crystals that are formed so as to have different values of isotropic phase transition temperature Tci but identical values for other parameters are considered. When such two liquid crystals are in a liquid crystal phase at a same liquid crystal temperature T, one of the liquid crystals having a lower isotropic phase transition temperature Tci has a lower value of orientational order parameter s than the other liquid crystal because the difference between liquid crystal temperature T and isotropic phase transition temperature Tci is smaller in the liquid crystal having a lower isotropic phase transition temperature Tci. This means that if two liquid crystals having a same helical pitch are included in respective liquid crystal layers having a same thickness, one of the liquid crystals having a higher isotropic phase transition temperature Tci will have a higher voltage threshold value at which a phase transition occurs compared with the liquid crystal having a lower isotropic phase transition temperature Tci.

In the foregoing, taking liquid crystal layer 250R as an example, explanation is made of the characteristics of liquid crystal and liquid crystal layer. However, when liquid crystal layers are stacked, it is necessary to take into consideration cases where divided voltages that are applied to the liquid crystal layers are varied. Therefore, explanation will be made of the voltage division in liquid crystal layer stack 300.

Figure 6:
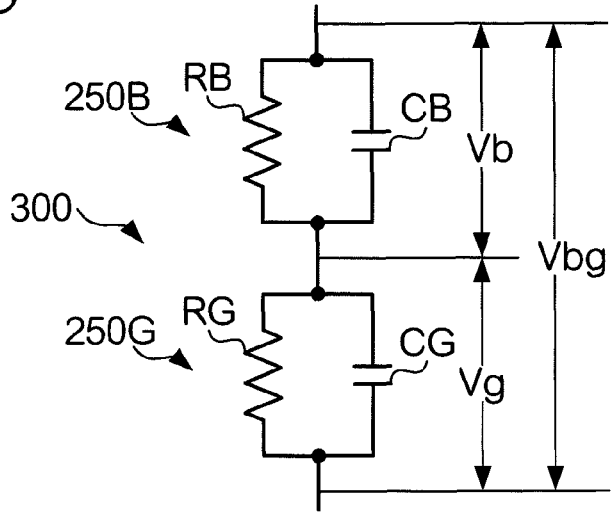
FIG. 6 shows an exemplary equivalent circuit of stacked liquid crystal layers.

FIG. 6 shows an example of an equivalent circuit of liquid crystal layer stack 300. Explanation will be made of liquid crystal layer stack 300 with reference to FIG. 6. Voltage Vbg shown in this drawing is a voltage applied to liquid crystal layer stack 300, which is a divisional voltage of a recording voltage applied between transparent electrodes 220 and 260 from voltage-applying section 140. Voltages Vb, Vg are voltages applied to liquid crystal layers 250B, 250G, respectively, as a result of division of voltage Vbg between liquid crystal layers 250B, 250G.

An equivalent circuit of liquid crystal layer 250B includes resistor RB and capacitor CB connected in parallel to each other, while an equivalent circuit of liquid crystal layer 250G includes resistor RG and capacitor CG connected in parallel to each other. Capacitors CB, CG have capacitances Cb, Cg, and dielectric constants $\in$b, $\in$g, respectively. Assuming here that capacitors CB, CG have a same plate separation d and same plate area S, the following relationship is obtained:

$$\frac{Vg}{Vb} = \frac{Cb}{Cg} = \frac{\varepsilon b}{\varepsilon g} \qquad (8)$$

Thus, the voltage division ratio is inverse-proportional to the dielectric constant ratio, and therefore, in a case where dielectric constant $\in$g is higher than dielectric constant $\in$b, voltage Vg becomes lower than voltage Vb. It should be noted that even if plate separation d in one liquid crystal layer is different from that of the other liquid crystal layer, the relationship that the divisional voltage applied to one liquid crystal layer decreases as the dielectric constant of the one liquid crystal layer increases still holds, so long as the plate separation d is limited to a certain value.

Each liquid crystal layer 250B, 250G, 250R is configured such that when the value of a voltage applied thereto (e.g., voltage Vb for liquid crystal layer 250B) becomes equal to or greater than a predetermined first threshold value, an initial alignment state (planar alignment state or focal-conic alignment state) changes to a focal-conic alignment state, and when the voltage further increases to be equal to or greater than a second threshold value, the alignment state becomes a homeotropic alignment state. Further, if application of a voltage (e.g., voltage Vb) is terminated in this state, the alignment state changes to the planar alignment state. Thus, in liquid crystal layer stack 300 including liquid crystal layers 250G, 250B, four threshold voltages VGpf, VBpf, VGfh, and VBfh are set for voltage Vbg applied to liquid crystal layer stack 300, in which threshold voltage VGpf is a voltage at which voltage Vg, which is applied to liquid crystal layer 250G, reaches its first threshold value and liquid crystal layer 250G undergoes transition into the focal-conic alignment state, threshold voltage VBpf is a voltage at which voltage Vb, which is applied to liquid crystal layer 250B, reaches its first threshold value and liquid crystal layer 250B undergoes transition into the focal-conic alignment state, threshold voltage VGfh is a voltage at which voltage Vg reaches its second threshold value and liquid crystal layer 250G undergoes transition into the homeotropic alignment state, and threshold voltage VBfh is a voltage at which voltage Vb reaches its second threshold value and liquid crystal layer 250B undergoes transition into the homeotropic alignment state.

It should be noted here that, as described above, for a given voltage Vbg applied to liquid crystal layer stack 300, voltages Vg, Vb can vary depending on the values of dielectric constants $\in$g, $\in$b. Therefore, if the first threshold values predetermined for liquid crystal layers 250G, 250B, respectively, have a same value, it could happen, for instance, that when voltage Vbg reaches the voltage VBpf that results in voltage Vb being equal to or greater than the first threshold value predetermined for liquid crystal layer 250B, voltage Vg remains below the first threshold voltage predetermined for liquid crystal layer 250G. Thus, in liquid crystal layer stack 300, the threshold voltages for voltage Vbg, at which alignment state transitions take place in the liquid crystals, are affected by the dielectric constants of liquid crystal layers 250G, 250B.

Provided that dielectric constants in the directions parallel to and vertical to the director of a liquid crystal are represented by $\in$P, $\in$V, respectively, dielectric constants in the planar alignment state, focal-conic alignment state, and homeotropic alignment state are given by $\in$V, ($\in$P+$\in$V)/2, and $\in$P, respectively. Further, the first threshold value is closely correlated with the dielectric constant for the focal-conic alignment state (($\in$P+$\in$V)/2), while the second threshold value is closely correlated with the dielectric constant for the homeotropic alignment state ($\in$P). In either case, $\in$P is included. If the liquid crystals have a positive dielectric-constant anisotropy, dielectric constant $\in$P increases as orientational order parameter s increases, and therefore, it is possible to achieve a larger difference between the threshold values of voltage Vbg for alignment state changes of stacked liquid crystal layers 250G, 250B (i.e., between threshold values VGpf and VBpf, or between threshold values VGfh and VBfh) by increasing isotropic phase transition temperature Tci (and hence increasing orientational order parameter s and dielectric constant $\in$P) of the liquid crystal contained in one of the liquid crystal layers associated with higher threshold values (usually, the liquid crystal having a larger dielectric constant $\in$P).

Dielectric constant $\in$P and isotropic phase transition temperature Tci are not completely independent from each other and can influence each other via orientational order parameter s. Therefore, setting dielectric constant $\in$P of one liquid crystal at a larger value than dielectric constant $\in$P of the other liquid crystal can result in a threshold value difference that is larger than otherwise expected.

As described above, the difference between threshold values VGpf and VBpf, and between threshold values VGfh and VBfh can change depending on dielectric constant $\in$P. Also, as will be understood from the above equations (1) and (2) regarding threshold values VRpf, VRfh for liquid crystal layer 250R, the threshold values can also change depending on helical pitch p. Specifically, because helical pitch p is included in the denominator in the right side of the equations regarding threshold values VRpf, VRfh, the threshold values become larger as the helical pitch p becomes shorter. Owing to such interactions, it is possible to expand the threshold voltage difference by setting isotropic phase transition temperature Tci of the liquid crystal associated with a higher threshold value to a temperature higher than isotropic phase transition temperature Tci of the other liquid crystal, preferably by 5° C. or more, and more preferably by 10° C. or more. It should be noted that a higher isotropic phase transition temperature Tci tends to result in a rise of a lower limit of a temperature range in which the liquid crystal is in a liquid crystal phase and/or an increase in viscosity of the liquid crystal, and therefore, the higher limit of isotropic phase transition temperature Tci should be determined such that a practically acceptable liquid crystal phase temperature range and viscosity are ensured. Also, because an excessively low isotropic phase transition temperature Tci can result in degradation of quality of an image recorded when the temperature is high, or in disappearance of the recorded image, such a low isotropic phase transition temperature Tci should be avoided.

Next, with reference to FIG. 7, explanation will be made of an example of control of liquid crystal alignment state in each pixel of first display layer 400 and second display layer 420.

Figure 7:
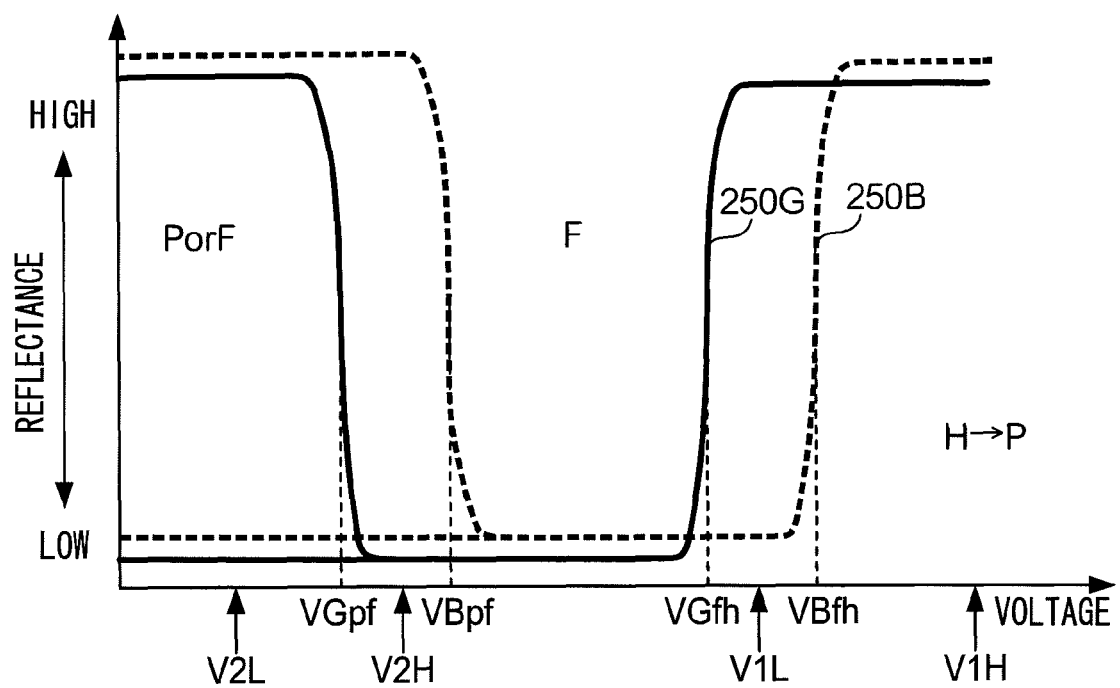
FIG. 7 shows an example of characteristics of reflectance of liquid crystal layers 250B, 250G.
Figure 11:
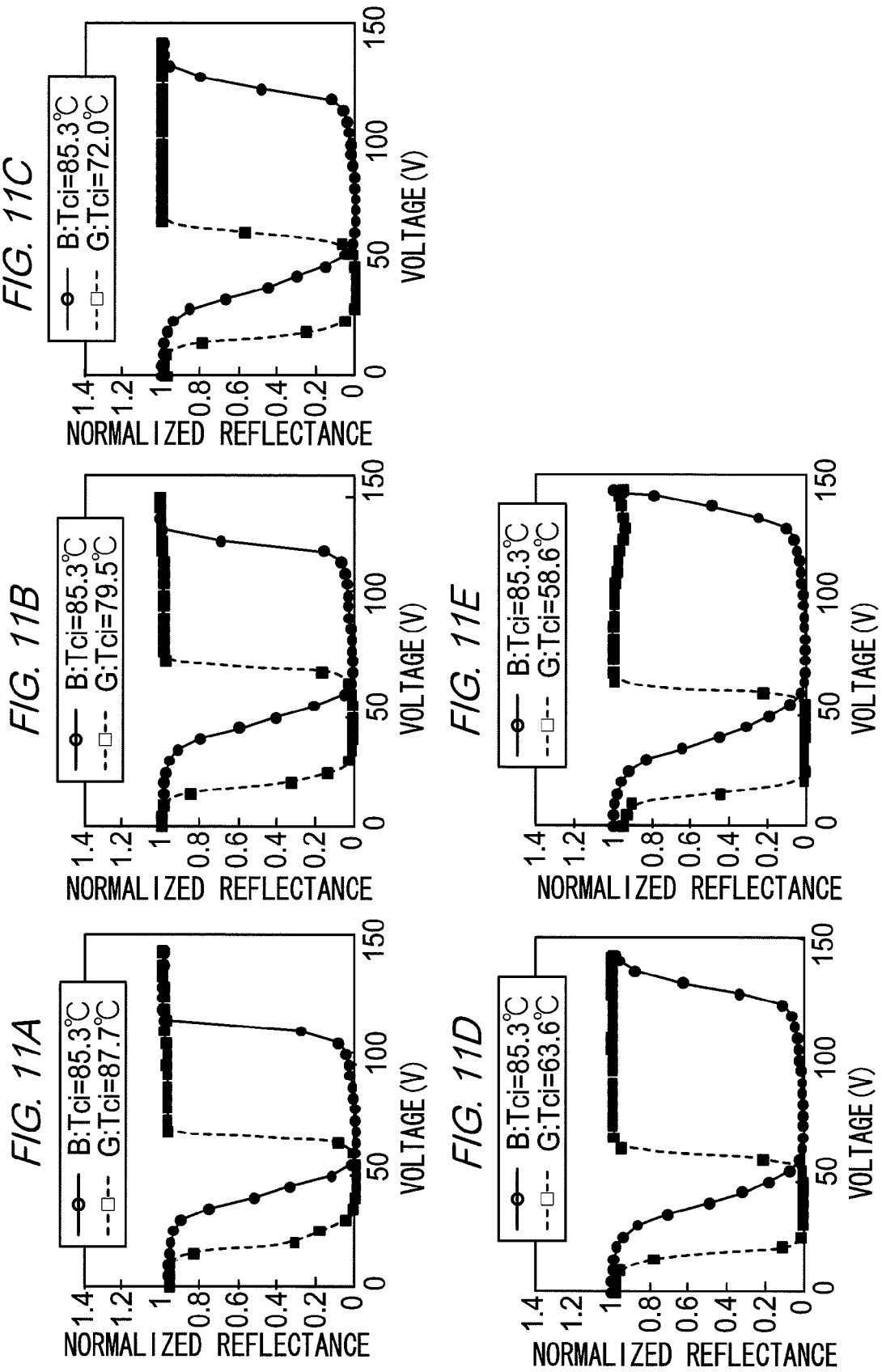
FIGS. 11A-11E are graphs showing normalized reflectance of liquid crystal layers 250GT, 250BT in relation to electric voltages applied to the stacked liquid crystal layers.

FIG. 7 shows exemplary characteristics of reflectance of liquid crystal layers 250B and 250G. The vertical axis of FIG. 7 represents the reflectances of liquid crystals 250B, 250G, while the horizontal axis represents voltage Vbg (=Vb+Vg) applied to liquid crystal layer stack 300, i.e., a voltage applied to all of liquid crystal layers 250B, 250G. In the example of FIG. 7, the threshold voltages for alignment state changes of liquid crystal layer 250G are lower than the threshold values for liquid crystal layer 250B. In other words, threshold voltage VGpf for causing liquid crystal layer 250G to undergo transition into the focal-conic alignment state is lower than threshold voltage VBpf for causing liquid crystal layer 250B to undergo transition into the focal-conic alignment state, and threshold voltage VGfh for causing liquid crystal layer 250G to undergo transition into the homeotropic alignment state is lower than threshold voltage VBfh for causing liquid crystal layer 250B to undergo transition into the homeotropic alignment state.

As shown in FIG. 7, when the value of voltage Vbg applied to liquid crystal layer stack 300 increases to exceed threshold value VGpf, voltage Vg becomes equal to or greater than the first threshold value of liquid crystal layer 250G, and liquid crystal layer 250G undergoes transition into a focal-conic alignment state. Subsequently, when the value of voltage Vbg exceeds threshold value VBpf, voltage Vb becomes equal to or greater than the first threshold value of liquid crystal layer 250B, which accordingly undergoes transition into a focal-conic alignment state. When voltage Vbg further increases to exceed threshold value VGfh, voltage Vg becomes equal to or greater than the second threshold value of liquid crystal layer 250G, which accordingly undergoes transition into a homeotropic alignment state. Then, when voltage Vbg further increases to exceed threshold voltage VBfh, voltage Vb becomes equal to or greater than the second threshold value of liquid crystal layer 250B, which also undergoes transition into a homeotropic alignment state.

Next, with reference to FIGS. 4, 7, and 8, explanation will be made of an operation of recording apparatus 100 for recording an image onto electronic paper 200. In a state that electronic paper 200 is set on recording apparatus 100, when an image recording instruction is input to recording apparatus 100 through user operation of operation section 120, for example, control section 110 retrieves image information that represents a color image, and starts a process for recording the image onto electronic paper 200.

First, recordation of red component of the image will be explained with reference to FIG. 4. The recordation of red component of the image is carried out by controlling of second display layer 420. When control section 110 controls voltage-applying section 140 to provide recording voltage V3 between transparent electrodes 222, 262, voltage V3 is divided between photoconductive layer 232 and liquid crystal layer 250R, whereby divisional voltage V3L is applied to liquid crystal layer 250R.

Then, based on image information regarding the red component of the image, control section 110 controls light-irradiating section 130 to irradiate red recording light. This reduces the resistance of photoconductive layer 232 and thus the voltage applied to liquid crystal layer 250R increases. It is to be noted that typically, the irradiation of recording light is performed from the side of film substrate 210, but light-irradiating section 130 may be configured to irradiate the recording light from the side of film substrate 270.

As a result, in regions of liquid crystal layer 250R that were irradiated with the recording light, the applied voltage increases to voltage V3H. When the application of recording voltage V3 is stopped, the regions of liquid crystal layer 250R irradiated with the recording light undergo transition into a planar alignment state to selectively reflect red light, while the regions not irradiated with the recording light undergo transition into a focal-conic alignment state. It is to be noted that before starting the image recording process, a reset process for erasing a previously recorded image or the like may be conducted.

Because photoconductive layer 230 is substantially transparent to red light, part of a red component of ambient light entering from the side of film substrate 270 can reach liquid crystal layer 250R, and part of it is reflected by the planar alignment state regions of liquid crystal layer 250R and output from film substrate 270. On the other hand, part of the red component of ambient light that passes through the focal-conic alignment regions of liquid crystal layer 250R is absorbed by photoconductive layer 232; if the red light absorption rate of photoconductive layer 232 is too low to achieve a satisfactory black color, an additional light absorption layer for absorbing red light may be provided at a position where the additional light absorption layer would not hinder the entrance of recording light to photoconductive layer 232. For example, in the structure where the recording light enters from the side of film substrate 210, the additional light absorption layer may be provided between photoconductive layer 232 and liquid crystal layer 250R.

Then, first display layer 400 is controlled to carry out the recordation of green and blue components of the image. In the following explanation, the planar alignment state is represented by P, the focal-conic alignment state is represented by F, and the combination of alignment states of liquid crystal layers 250G, 250B is represented by, for example, (P, P). As will be understood, there are four combinations of alignment states of liquid crystal layers 250G, 250B: i.e., (P, P); (P, F); (F, P); and (F, F). In the following, control for bringing regions of the liquid crystal layers to one of these alignment states will be explained with reference to FIGS. 7 and 8.

As shown in FIG. 7, when control section 110 controls voltage-applying section 140 to provide recording voltage V1 between transparent electrodes 220, 260, voltage V1 is divided between photoconductive layer 230 and liquid crystal layer stack 300, and voltage Vbg applied to liquid crystal layer stack 300 becomes voltage V1L (VGfh<V1L<VBfh). In this state, liquid crystal layer 250G undergoes transition into a homeotropic alignment state while liquid crystal layer 250B undergoes transition into a focal-conic alignment state.

Then, according to image information regarding the green component of the image, control section 110 controls light-irradiating section 130 to irradiate blue (or green) recording light. This reduces the resistance of photoconductive layer 230 and thus the voltage applied to liquid crystal layer stack 300 increases. It is to be noted that typically, the irradiation of recording light is performed from the side of film substrate 210, but light-irradiating section 130 may be configured to irradiate the recording light from the side of film substrate 270.

As a result, in regions of liquid crystal layer stack 300 that were irradiated with the recording light, applied voltage Vbg increases to voltage V1H (VBfh<V1H). When the application of recording voltage V1 is stopped, the liquid crystal alignment state of the regions of liquid crystal layer stack 300 not irradiated with the recording light becomes (P, F), while the liquid crystal alignment state of the regions irradiated with the recording light becomes (P, P) because in the light-irradiated regions, not only liquid crystal layer 250G but also liquid crystal layer 250B undergoes transition into a planar alignment state. It is to be noted that before starting the image recording process, a reset process for erasing a previously recorded image or the like may be conducted.

Subsequently, control section 110 controls voltage-applying section 140 to apply recording voltage V2 between transparent electrodes 220, 260. Recording voltage V2 is divided between photoconductive layer 230 and liquid crystal layer stack 300, where voltage Vbg applied to liquid crystal layer stack 300 becomes voltage V2L (V2L<VGph). In this state, the alignment state of each region of liquid crystal layers 250G, 250B is maintained in either (P, F) or (P, P).

Then, based on image information regarding the blue component of the image, control section 110 controls light-irradiating section 130 to irradiate blue (or green) recording light. This reduces the resistance of photoconductive layer 230 and thus the voltage applied to liquid crystal layer stack 300 increases. As a result, in regions of liquid crystal layer stack 300 that were irradiated with the recording light, applied voltage Vbg increases to voltage V2H (VGpf<V2H<VBpf), and the alignment state of liquid crystal layer 250G in these regions undergoes transition into the focal-conic alignment state. Thus, of the regions which had been in the alignment state (P, F), the part that was irradiated with the recording light undergoes transition into an alignment state (F, F), and of the regions which had been in the alignment state (P, P), the part that was irradiated with the recording light undergoes transition into alignment state (F, P). On the other hand, the part that was not irradiated with the recording light remains in the same alignment state as before the irradiation of the recording light (i.e., either (P, F) or (P, P)). These alignment states are maintained after the application of recording voltage V2 is terminated.

FIG. 8 illustrates the changes of alignment states of liquid crystal layers 250G, 250B. As described above with reference to FIG. 7, control section 110 controls light-irradiating section 130 and voltage-applying section 140 according to the green and blue components of the image, and controls the presence/absence of recording light irradiation during the application of recording voltage V1 as well as the presence/absence of recording light irradiation during the application of recording voltage V2 to select one of the alignment state combinations (P, P), (P, F), (F, P), and (F, F) as an alignment state of liquid crystal layers 250G, 250B for each position in electronic paper 200.

It should be noted here that blue and green components of the part of ambient light that has entered from the side of film substrate 270 and passed through liquid crystal layers 250G, 250B without being reflected are absorbed by photoconductive layer 230, and red component of the same is reflected by liquid crystal layer 250R or absorbed by photoconductive layer 232, as described above. If the blue and green light absorption rate of photoconductive layer 230 is too low to achieve a satisfactory black color, an additional light absorption layer for absorbing blue light and green light may be provided at a position where the additional light absorption layer would not hinder the entrance of recording light to photoconductive layer 230. For example, in the structure where the recording light enters from the side of film substrate 210, the additional light absorption layer may be provided between photoconductive layer 230 and liquid crystal layer 250G.

In this way, a part of electronic paper 200 where liquid crystal layers 250B, 250G, and 250R are all in the focal-conic alignment state will appear black when seen from the side of film substrate 270. For a part where liquid crystal layer 250R is in the planar alignment state, if the alignment state of liquid crystal layers 250B, 250G is (P, P), the color will appear white, if (P, F), yellow, if (F, P), magenta, and if (F, F), red. Similarly, for a part where liquid crystal layer 250R is in the focal-conic alignment state, if the alignment state of liquid crystal layers 250B, 250G is (P, P), the color will appear cyan, if (P, F), green, and if (F, P), blue.

In the above explanation, the control of second display layer 420 is conducted first, followed by the control of first display layer 400. However, the order of control may be reversed so that the control is conducted in the order of first display layer 400 and second display layer 420. Thus, the alignment state control of liquid crystal layers 252B, 252G, 252R is as explained above.

To properly conduct the alignment state control of individual liquid crystal layers in the liquid crystal layer stack as described above, it is preferred that the difference between threshold values VBpf and VGpf, and the difference between threshold values VBfh and VGfh are large. As described above, the threshold values VBpf, VGpf, VBfh, and VGfh are related to the first and second threshold values of liquid crystal layers 250B, 250G, and in the liquid crystal phase, the first and second threshold values tend to be lower when a value of isotropic phase transition temperature Tci of liquid crystal contained in the liquid crystal layer is lower.

Also, as described above, the first and second threshold values of liquid crystal layers tend to increase as helical pitch p becomes shorter.

On the other hand, a cholesteric liquid crystal can be obtained by addition of an optically active compound called a chiral dopant into a nematic liquid crystal, and to achieve a shorter helical pitch, it is necessary to add a larger amount of chiral dopant, which operates to lower the isotropic phase transition temperature. As a result, in a conventional electronic paper having a stack of liquid crystal layers, a liquid crystal layer having higher threshold values for alignment state changes has a lower isotropic phase transition temperature than a liquid crystal layer having lower threshold values.

Though on one hand, the addition of a large amount of chiral dopant makes the helical pitch shorter and thus has an effect of raising the threshold values, it lowers the isotropic phase transition temperature on the other hand, and thus has an effect of lowering the threshold values. Thus, the addition of chiral dopant has opposing effects on the threshold values. According to an exemplary embodiment of the present invention, the isotropic phase transition temperature of a liquid crystal having higher threshold values for alignment state changes is set at a higher value than the isotropic phase transition temperature of a liquid crystal having lower threshold values, as opposed to conventional electronic paper. In this way, the higher isotropic temperature set for the liquid crystal having higher threshold values serves to increase the threshold values even further, and the lower isotropic temperature set for the liquid crystal having lower threshold values serves to decrease the threshold values even further, thus significantly expanding the differences in corresponding threshold values between the liquid crystals.

Thus, in the example of FIG. 7, by setting isotropic phase transition temperature Tci of liquid crystal 252B included in liquid crystal layer 250B to be higher than isotropic phase transition temperature Tci of liquid crystal 252G included in liquid crystal layer 250G, it is possible to increase the differences between the first and second threshold values of liquid crystal layer 250B and the first and second threshold values of liquid crystal layer 250G. This leads to a larger difference between threshold values VGpf and VBpf and a larger difference between threshold values VGfh and VBfh set for voltage Vbg, and therefore, control of recording voltage V2H, which is to be set at a value in a range between threshold values VGpf and VBpf, as well as recording voltage V1L, which is to be set at a value between threshold values VGfh and VBfh, becomes easy, which in turn facilitates reliable control of alignment state of individual liquid crystal layers.

The isotropic phase transition temperature can be controlled by controlling of a molecular structure of a liquid crystal compound or mixing of a plurality of liquid crystal compounds having different isotropic phase transition temperatures, for example.

Regarding the molecular structure, a liquid crystal compound is a material formed by a rigid, rod-like core molecule having a flexible tail such as an alkyl group, and a longer core tends to lead to a higher isotropic phase transition temperature. For example, a liquid crystal compound having a terphenyl group as a core has a higher isotropic phase transition temperature than a liquid crystal compound having a biphenyl group as a core. The isotropic phase transition temperature also depends on the rigidity of the core. For example, a liquid crystal compound having a core containing two phenyl rings connected via a rigid tolane group (—C≡C—) has a higher isotropic phase transition temperature than a liquid crystal compound having a core containing two phenyl groups connected via an ester group (—COO—) which has a lower rigidity than a tolane group.

The core generally has an annular structure, and a liquid crystal compound containing a cyclohexane ring has a higher isotropic phase transition temperature than a liquid crystal compound containing a phenyl ring. Further, a larger width of the core tends to result in a lower isotropic phase transition temperature. For example, a liquid crystal compound with a core having an alkyl group or halogen group as a lateral substitution group of a phenyl group has a lower isotropic phase transition temperature than a liquid crystal compound with a core not having such a substitution group.

Regarding the length of the tail, the isotropic phase transition temperature may increase as the length of the tail increases in some liquid crystal compounds, but may decrease in other liquid crystal compounds. Also, in still other liquid crystal compounds, the isotropic phase transition temperature may have a minimum value for a certain length of the tail. Thus, the characteristics of isotropic phase transition temperature with respect to the tail length may vary depending on liquid crystal compounds, but nonetheless, the length of the tail can be used as a control factor for the isotropic phase transition temperature. In a case where the tail has an alkyl group, the liquid crystal compound tends to have a higher isotropic phase transition temperature if an odd number of carbon atoms are contained therein, while in a case where the tail has an alkoxy group, the liquid crystal compound tends to have a higher isotropic phase transition temperature if an even number of carbon atoms are contained therein.

Based on the foregoing, it is possible in the example of FIG. 7 to set a higher isotropic phase transition temperature in liquid crystal 252B having higher threshold voltage values for alignment state changes than in liquid crystal 252G having lower threshold voltage values for alignment state changes by, for example, forming liquid crystal 252B mainly from a liquid crystal compound having a terphenyl ring and an alkyl group with an odd number of carbon atoms and thus having a high isotropic phase transition temperature, while constituting liquid crystal 252G mainly from a liquid crystal compound having a biphenyl ring and an alkoxy group with an odd number of carbon atoms.

The isotropic phase transition temperature can be also adjusted by addition of an isotropic liquid and/or chiral dopant to commercially available nematic liquid crystal composite or cholesteric liquid crystal composite. The isotropic liquid referred to here indicates an optically inactive liquid having a freezing temperature below a room temperature and the chiral dopant indicates an optically active compound that, when mixed with a liquid crystal compound, induces a helical molecular arrangement. For instance, when an isotropic liquid is added to a cholesteric liquid crystal, the isotropic phase transition temperature is lowered.

On the other hand, addition of an isotropic liquid makes the helical pitch longer, and therefore, to maintain the helical pitch, a chiral dopant having the same twist direction as the original helix is also added to adjust the helical pitch and isotropic phase transition temperature Tci. The addition of chiral dopant makes the helical pitch shorter and lowers isotropic phase transition temperature Tci in general. In a case where a nematic liquid crystal is added to increase the helical pitch, it is possible to decrease the amount of added nematic liquid crystal in accordance with an amount of the added isotropic liquid to keep the helical pitch at a desired value.

Next, with reference to FIGS. 9-13, explanation will be made of the results of an experiment conducted to show the above-described relationship between the change in the isotropic phase transition temperature of the liquid crystal and the characteristics of threshold voltages for alignment state changes of each liquid crystal contained in the liquid crystal layer stack.

FIG. 9 is a drawing that shows a structure of electronic paper 200T used in the experiment. In this electronic paper 200T, cholesteric liquid crystals 252BT, 252GT which are prepared so as to reflect blue light and green light, respectively, are encapsulated in micro-capsules 253BT, 253GT, which in turn are dispersed in binders 251BT, 252GT to form liquid crystal layers 250BT, 250GT, respectively. Liquid crystal layers 250BT, 250GT are stacked together and sandwiched between a pair of transparent electrodes 220T, 260T to form a liquid crystal layer stack 300T. In this experiment, values of later-described various parameters were recorded during changing of a voltage applied to liquid crystal layer stack 300T.

Liquid crystal 252BT for reflecting blue light was formed by adding chiral dopant R-1011 to cholesteric liquid crystal MJ08424 that reflects green light so that the resulting liquid crystal has a helical pitch of 294 nm and an isotropic phase transition temperature TciB of 85.3° C. On the other hand, as liquid crystal 252GT for reflecting green light, samples G-1, G-2, G-3, G-4, G-5 were prepared. Specifically, sample G-1 was formed by mixing of 85.47% of cholesteric liquid crystal MJ08423 that reflects blue light with 14.53% of nematic liquid crystal MJ071934, and used as Comparison Example 1. Samples G-2, G-3, G-4, and G-5 were prepared as examples for demonstrating the present invention. Specifically, samples G-2 G-3, G-4, and G-5 were prepared by addition of different amounts of isotropic liquid 4-pentylbiphenyl to sample G-1 and reduction of the amount of nematic liquid crystal MJ071934 in accordance with the added amount of isotropic liquid. The helical pitch was 331 nm in all of the samples.

FIG. 10 shows the composition and isotropic phase transition temperature TciG of each sample. The values of MJ08423, MJ071934, and 4-pentylbiphenyl of each sample are shown as weight percent (%) of the materials. As shown, isotropic phase transition temperature TciG decreased with the increase of an amount of isotropic liquid, 4-pentylbiphenyl.

In each sample, a dielectric constant ratio ∈b/∈g was greater than one, and dielectric constant ∈P of liquid crystal 252BT was larger than dielectric constant ∈P of liquid crystal 252GT.

FIGS. 11A-11E are graphs showing normalized reflectances of liquid crystal layers 250GT, 250BT with respect to the voltage applied to liquid crystal layer stack 300T (or voltage applied between transparent electrodes 220T, 260T). The normalized reflectances were obtained by measuring of the reflectance of each liquid crystal layer as a function of the applied voltage, subtracting the minimum value of the reflectance from the measured reflectance, and dividing the subtraction result by a difference between the maximum and minimum values of the reflectance, and thus has a value in the range from zero to one. It is to be noted that the reflectance of each liquid crystal layer 250GT, 250BT can be obtained as a reflectance at the wavelength where the reflectance has its peak in the reflectance spectrum of each liquid crystal layer. FIGS. 11A-11E correspond to experimental results in which samples G-1 to G-5 of liquid crystal 252GT shown in FIG. 9 were used in liquid crystal layer 250GT, respectively. As shown in these graphs, as isotropic phase transition temperature TciG decreases, the respective differences between threshold values VGpf, VGfh of liquid crystal layer 250GT and threshold values VBpf, VBfh of liquid crystal layer 250BT increased. Particularly, the increase was conspicuous in the difference between threshold value VGfh and threshold value VBfh.

Now, explanation will be made of the above-described changes in threshold values. In a state where a voltage is applied to liquid crystal layer stack 300T such that the divisional voltage applied to liquid crystal layer 250BT is close to threshold value VBfh, in accordance with the alignment state of each liquid crystal 252BT, 220GT, the dielectric constant of each liquid crystal 252BT, 220GT has a value close to dielectric constant ∈P, which is a dielectric constant in the direction parallel to the director of each liquid crystal, as described above. As isotropic phase temperature TciG decreases, dielectric constant ∈P of liquid crystal 252GT decreases and is lowered relative to dielectric constant ∈P of liquid crystal 252BT. This reduces the divisional voltage applied to liquid crystal layer 250BT. As a result, a higher voltage applied to liquid crystal layer stack 300T becomes necessary for liquid crystal 252BT to undergo transition into the homeotropic alignment state, i.e., threshold voltage VBfh increases. Moreover, as isotropic phase transition temperature TciG decreases, threshold voltage VGfh of liquid crystal 252GT decreases according to formulae (6) and (7), and this works synergetically with the effects of divisional voltage to expand the difference between threshold values VBfh and VGfh.

On the other hand, in a state where a voltage is applied to liquid crystal layer stack 300T such that the divisional voltage applied to liquid crystal layer 250BT is close to threshold value VBpf, the dielectric constant of each liquid crystal 252BT, 250GT is close to (∈P+∈V)/2. It is to be noted here that as isotropic phase transition temperature Tci increases, dielectric constant ∈P increases but dielectric constant ∈V does not change significantly. Therefore, the change of (∈P+∈V)/2 is smaller compared with the above-described change of dielectric constant ∈P regarding the higher threshold value VBfh for alignment state change to the homeotropic alignment state. Thus, the difference between threshold values VBpf, VGpf changes less drastically than the difference between threshold values VBfh, VGfh.

To quantitatively describe the above expansion of difference between threshold values, upper and lower voltage margins are defined as explained below.

FIG. 12 is a schematic drawing for explaining the upper and lower voltage margins. As shown in the drawing, voltage $V_{10/2H}$ is defined as a voltage at which the normalized reflectance of liquid crystal 252GT becomes 0.1 (10%) when the state of liquid crystal 252GT undergoes transition from the focal-conic alignment state to the homeotropic alignment state, and voltage $V_{90/2L}$ is defined as a voltage at which the normalized reflectance of liquid crystal 252GT becomes 0.9 (90%) when the state of liquid crystal 252GT undergoes transition from the planar alignment state to the focal-conic alignment state. Further, voltage $V_{90/1H}$ is defined as a voltage at which the normalized reflectance of liquid crystal 252BT becomes 0.9 (90%) when the state of liquid crystal 252BT changes from the focal-conic alignment state to the homeotropic alignment state, and voltage $V_{10/1L}$ is defined as a voltage at which the normalized reflectance of liquid crystal 252BT becomes 0.1 (10%) when the state of liquid crystal 252BT undergoes transition from the planar alignment state to the focal-conic alignment state. Then, the upper and lower voltage margins are calculated according to the following equations:

$$\text{Lower Voltage Margin} = (V_{90/2L} - V_{10/1L})/(V_{90/2L} + V_{10/1L})$$

$$\text{Upper Voltage Margin} = (V_{10/2H} - V_{90/1H})/(V_{10/2H} + V_{90/1H})$$

FIGS. 13A and 13B are a table and a graph, respectively, showing characteristics of the upper and lower voltage margins with respect to the difference in isotropic phase transition temperature between liquid crystals 252GT, 252BT (i.e., TciG−TciB). In the graph in FIG. 13B, the vertical axis represents the values of upper and lower voltage margins, while the horizontal axis represents the difference in isotropic phase transition temperature (TciG−TciB). As seen in this graph, as the difference in isotropic phase transition temperature (TciG−TciB), which has a highest value in Comparison Reference 1, decreases relative to the highest value, i.e., as isotropic phase transition temperature TciG of liquid crystal 252GT decreases, the upper and lower voltage margins substantially change to larger values. Thus, the upper and lower voltage margins are increased by setting of isotropic phase transition temperature TciG of liquid crystal 252GT of liquid crystal layer 250GT, which in this embodiment has relatively lower threshold values for alignment state changes, such that isotropic phase transition temperature TciG is lower than isotropic phase transition temperature TciB of liquid crystal 252BT of liquid crystal layer 250BT, which in this embodiment has relatively higher threshold values for alignment state changes.

In the foregoing, an exemplary embodiment of the present invention has been described, but the present invention may be implemented in varying embodiments, as explained below.

<Modified Embodiment 1>

In the above-described embodiment, the threshold values for alignment state transitions of liquid crystal layer 250GT for reflecting green light (or having a relatively long helical pitch) are smaller than those for liquid crystal layer 250BT for reflecting blue light (or having a relatively short helical pitch), and the isotropic phase transition temperature of liquid crystal 252GT is lower than that of liquid crystal 252BT. However, these relationships may be reversed. In the following, explanation will be made of experimental results in which isotropic phase transition temperature TciB of liquid crystal 252BT is varied to five different temperatures such that isotropic phase transition temperature TciB is lower than isotropic phase transition temperature TciG of liquid crystal 252GT, in an exemplary case where the threshold values for alignment state changes of liquid crystal layer 250GT are larger than those for liquid crystal layer 250BT.

As liquid crystal 252GT for reflecting green light, cholesteric liquid crystal MJ081646 (manufactured by Merck Ltd. Japan) that has a helical pitch of 331 nm and isotropic phase transition temperature TciG of 88.2° C. was used. On the other hand, as liquid crystal 252BT for reflecting blue light, samples B-1, B-2, B-3, B-4, and B-5 were prepared by addition of chiral dopant R-1011 and isotropic liquid 4-pentylbiphenyl to cholesteric liquid crystal MJ08423 that reflects blue light. In all of these samples, the helical pitch was 294 nm.

Further, sample B-6 in which relationship TciB−TciG>0 holds was prepared as Comparison Example 2 by addition of chiral dopant R-1011 and 4-n-pentyl-4"-cyano-p-terphenyl (manufactured by DKSH Japan K.K.) to cholesteric liquid crystal MJ08423.

FIG. 14 shows the composition, isotropic phase transition temperature difference TciB−TciG, and dielectric constant ratio ∈b/∈g for each sample. The composition is represented by weight percent (%) of each material. In each sample, dielectric constant ratio ∈b/∈g was smaller than one, and dielectric constant ∈P of liquid crystal 252BT was smaller than dielectric constant ∈P of liquid crystal 252GT.

FIGS. 15A-15F are graphs showing normalized reflectances of liquid crystal layers 250GT, 250BT with respect to the voltage applied to liquid crystal layer stack 300T. FIGS. 15A-15F correspond to experimental results in which samples B-6 to B-1 of liquid crystal 252BT shown in FIG. 14 were used, respectively, in liquid crystal layer 250BT. As is shown in these graphs, as isotropic phase transition temperature TciB decreases, the respective differences between threshold values VBpf, VBfh of liquid crystal layer 250BT and threshold values VGpf, VGfh of liquid crystal layer 250GT increase. Particularly, the increase is conspicuous in the difference between threshold value VBfh and threshold value VGfh.

Figures 16A, 16B:
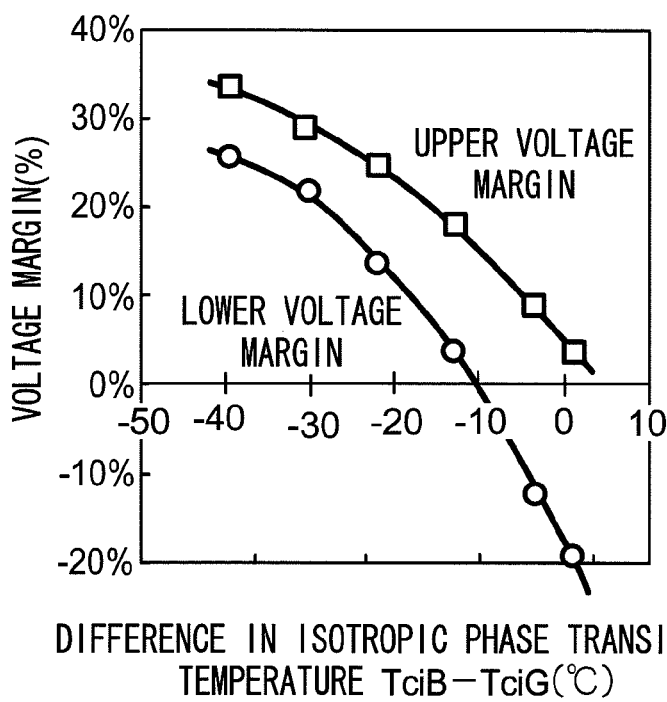
FIGS. 16A and 16B are a table and a graph, respectively, showing a relationship between upper and lower voltage margins and a difference in isotropic phase transition temperature between liquid crystals 252BT, 252GT.

FIGS. 16A and 16B are a table and a graph, respectively, showing the characteristics of the upper and lower voltage margins with respect to the difference in isotropic phase transition temperature between liquid crystals 252BT, 252GT (i.e., TciB−TciG). In the graph of FIG. 16B, the vertical axis represents the values of upper and lower voltage margins, while the horizontal axis represents the difference in isotropic phase transition temperature (TciB−TciG). As is shown in this graph, as the difference in isotropic phase transition temperature (TciB−TciG), which has a highest value in Comparison Reference 2, decreases relative to the highest value, i.e., as isotropic phase transition temperature TciB of liquid crystal 252BT decreases, the upper and lower voltage margins substantially change to a larger value. Thus, the upper and lower voltage margins are increased by setting of isotropic phase transition temperature TciB of liquid crystal 252BT of liquid crystal layer 250BT, which in this embodiment has relatively lower threshold values for alignment state changes, such that isotropic phase transition temperature TciB is lower than isotropic phase transition temperature TciG of liquid crystal 252GT of liquid crystal layer 250GT, which in this embodiment has relatively higher threshold values for alignment state changes.

It should be noted that in Modified Embodiment 1, a chiral dopant is added to suppress a change in helical pitch that otherwise would be caused by the isotropic liquid added to decrease isotropic phase transition temperature TciB, while in Exemplary Embodiment, an amount of nematic liquid crystal is decreased to suppress the change in the helical pitch that otherwise would be caused along with the decreasing of isotropic phase transition temperature TciG. These differences can result in different dielectric constants of the liquid crystals.

Comparing the voltage margins between Exemplary Embodiment and Modified Embodiment 1, it is understood that for a same difference in isotropic phase transition temperature (absolute value), the margins are generally larger in Exemplary Embodiment than in Modified Embodiment 1. This may be because in Exemplary Embodiment, isotropic phase transition temperature Tci is set higher in the liquid crystal having a relatively short helical pitch (and higher dielectric constant ∈P) than in the liquid crystal having a relatively long helical pitch, and both of the higher isotropic phase transition temperature Tci and shorter helical pitch contribute to increasing the threshold values.

<Modified Embodiment 2>

In the above-described Exemplary Embodiment, liquid crystal layers 250B, 250G, 250R are configured such that they reflect different colors of light when in the planar alignment state, or the wavelength distributions of the reflected light are different from each other. However, in a case where it is not desired to record a color image, the liquid crystal layers may not reflect different colors of light, and control of light reflection or transmission at each liquid crystal layer may be conducted to control the gradation of the monochromatic recorded image.

<Modified Embodiment 3>

In the above-described Exemplary Embodiment, an image is recorded by irradiating light to the display medium. However, other structures may be adopted to record an image. For example, transparent electrodes 220, 222, 260, 262 may be divided corresponding to the pixels of the display medium so that the application of recording voltage can be controlled for each of the divided electrodes. In such a structure, it is possible to control the amplitude and frequency of the recording voltage applied to the divided transparent electrodes individually so as to change the alignment state of the liquid crystal provided between the associated ones of the divided transparent electrodes, to thereby record the image. Thus, in this embodiment, photoconductive layers 230, 232 may be omitted.

<Modified Embodiment 4>

In the above-described Exemplary Embodiment, first display layer 400 contains a pair of liquid crystal layers 250B, 250G, but it may contain either one of these liquid crystal layers or a single liquid crystal layer that reflects light of a color different from the light reflected by liquid crystal layers 250B, 250G. Conversely, though in the above-described Exemplary Embodiment second display layer 420 contained a single liquid crystal layer 250R, an additional liquid crystal layer for reflecting light of a color other than red may be stacked thereon. In such a case, photoconductive layer 230 should be adapted so as to be transparent to the colors of light reflected by the liquid crystal layers contained in second display layer 420.

<Modified Embodiment 5>

In the above-described Exemplary Embodiment and Modified Embodiments, an isotropic liquid is used as an additive to decrease isotropic phase transition temperature Tci of the liquid crystal, but other additives, such as a nematic liquid crystal having a lower isotropic phase transition temperature, may also be used to decrease isotropic phase transition temperature Tci of the liquid crystal. The material for decreasing isotropic phase transition temperature Tci may or may not change the helical pitch when added to the liquid crystal. In a case where the helical pitch is changed, for example, if the helical pitch is increased, an amount of material that acts to increase the helical pitch may be reduced and/or a material that acts to decrease the helical pitch may be added to adjust the wavelength distribution of the reflected light. Such materials used to alter the helical pitch may increase or decrease the isotropic phase transition temperature or may not change the isotropic phase transition temperature. Thus, by mixing a plurality of materials that cause different amounts of change in the helical pitch relative to a prescribed amount of change in isotropic phase transition temperature Tci and adding the mixture to the host liquid crystal, it is possible to control the helical pitch and isotropic phase transition temperature Tci to lower the isotropic phase transition temperature of the liquid crystal contained in the liquid crystal layer having lower threshold values for alignment state changes.

<Modified Embodiment 6>

In the above-described Exemplary Embodiment, the described control of recording voltages applied to liquid crystal layer stack 300 when recording an image on electronic paper 200 is only an example, and any control of recording voltages may be adopted so long as the control of voltages applied to liquid crystal layer stack 300 can change the alignment states of liquid crystals 252B, 252G independently. It is preferred that such a control contains applying voltage Vbg having voltage values V2H, V1L.

The foregoing description of the embodiments of the present invention is provided for the purposes of illustration and description. It is not intended to be exhaustive or to limit the invention to the precise forms disclosed. Obviously, many modifications and variations will be apparent to practitioners skilled in the art. The embodiments were chosen and described to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display medium comprising:
a pair of electrodes to which a voltage is applied; and
a liquid crystal layer stack provided between the pair of electrodes, the liquid crystal layer stack containing a first liquid crystal layer having a first liquid crystal that undergoes transition into a specific alignment state in response to the voltage applied to the electrodes becoming equal to or greater than a first voltage value and a second liquid crystal layer having a second liquid crystal that undergoes transition into the specific alignment state in response to the voltage becoming equal to or greater than a second voltage value,
wherein:
the second voltage value is greater than the first voltage value; and
the second liquid crystal has a higher isotropic phase transition temperature than the first liquid crystal.

2. The display medium according to claim 1, wherein a dielectric constant of the second liquid crystal in a direction parallel to a director of the second liquid crystal is greater than a dielectric constant of the first liquid crystal in a direction parallel to a director of the first liquid crystal.

3. The display medium according to claim 1, wherein a wavelength distribution of light reflected from the second liquid crystal in a light-reflecting alignment state is shifted toward a shorter wavelength side than a wavelength distribution of light reflected from the first liquid crystal in the light-reflecting alignment state.

4. The display medium according to claim 2, wherein a wavelength distribution of light reflected by the second liquid crystal in a light-reflecting alignment state is shifted toward a shorter wavelength side than a wavelength distribution of light reflected by the first liquid crystal in the light-reflecting alignment state.

5. The display medium according to claim 1, wherein:
the first liquid crystal contains a plurality of materials that change the isotropic phase transition temperature and that change a wavelength distribution of light reflected by the first liquid crystal in a light-reflecting alignment state; and
an amount of change in the wavelength distribution relative to an amount of change in the isotropic phase transition temperature caused by one of the plurality of materials is different from that caused by each of the other materials.

6. The display medium according to claim 2, wherein:
the first liquid crystal contains a plurality of materials that change the isotropic phase transition temperature and that change a wavelength distribution of light reflected by the first liquid crystal in a light-reflecting alignment state; and
an amount of change in the wavelength distribution relative to an amount of change in the isotropic phase transition temperature caused by one of the plurality of materials is different from that caused by each of the other materials.

7. The display medium according to claim 1, further comprising a photo-sensitive layer sandwiched between the liquid crystal layer stack and one of the pair of electrodes, wherein the voltage applied to the pair of electrodes is divided between the liquid crystal layer stack and the photo-sensitive layer, and in response to irradiation of light upon the photo-sensitive layer, the photo-sensitive layer causes a divisional voltage ratio of the liquid crystal layer stack to increase.

8. The display medium according to claim 2, further comprising a photo-sensitive layer sandwiched between the liquid crystal layer stack and one of the pair of electrodes, wherein the voltage applied to the pair of electrodes is divided between the liquid crystal layer stack and the photo-sensitive layer, and in response to irradiation of light upon the photo-sensitive layer, the photo-sensitive layer causes a divisional voltage ratio of the liquid crystal layer stack to increase.

* * * * *